(12) United States Patent
Coupe et al.

(10) Patent No.: US 7,926,761 B2
(45) Date of Patent: Apr. 19, 2011

(54) MECHANICAL PART AND METHOD OF MANUFACTURING SUCH A PART

(75) Inventors: Dominique Coupe, Le Haillan (FR); Bruno Jacques Gerard Dambrine, Le Chatelet en Brie (FR); Fabienne Lacorre, Vaux le Penil (FR); Alain Madec, Chartrettes (FR); Jean-Noel Mahieu, Paris (FR)

(73) Assignee: SNECMA, Paris (FR)

(*) Notice: Subject to any disclaimer, the term of this patent is extended or adjusted under 35 U.S.C. 154(b) by 946 days.

(21) Appl. No.: 11/425,082

(22) Filed: Jun. 19, 2006

(65) Prior Publication Data

US 2007/0007386 A1    Jan. 11, 2007

(30) Foreign Application Priority Data

Jun. 24, 2005  (FR) ...................... 05 06441

(51) Int. Cl.
*B64C 25/02* (2006.01)
*F16C 7/00* (2006.01)
(52) U.S. Cl. ............... 244/102 R; 244/102 A; 74/579 R
(58) Field of Classification Search ............... 244/100 R, 244/102 R, 102 A, 102 SL, 102 SS, 108, 244/109; 52/836, 837; 280/124.1, 124.125; 74/579 R
See application file for complete search history.

(56) References Cited

U.S. PATENT DOCUMENTS

| | | | | |
|---|---|---|---|---|
| 3,017,143 A | * | 1/1962 | Hartel ........................ 244/102 R |
| 3,532,308 A | * | 10/1970 | Cervelli et al. ......... 244/104 LS |
| 4,268,560 A | | 5/1981 | Maistre |
| 4,300,410 A | * | 11/1981 | Raghupathi et al. ........ 74/579 R |
| 4,414,860 A | * | 11/1983 | Brunsch et al. ............. 74/579 E |
| 4,659,069 A | | 4/1987 | Odobasic |
| 5,019,435 A | * | 5/1991 | Cahuzac et al. ............. 428/36.1 |
| 5,211,967 A | * | 5/1993 | Yasui et al. .................... 442/206 |
| 5,429,853 A | * | 7/1995 | Darrieux ......................... 156/93 |
| 6,244,538 B1 | * | 6/2001 | Howard et al. ........... 244/104 R |
| 6,324,940 B1 | * | 12/2001 | Pazdirek et al. ............ 74/579 R |
| 2005/0056503 A1 | * | 3/2005 | Jones ....................... 188/321.11 |

FOREIGN PATENT DOCUMENTS

| | | |
|---|---|---|
| CH | 652 176 A5 | 10/1985 |
| DE | 32 04 993 A1 | 8/1983 |
| EP | 0 678 681 A1 | 10/1995 |
| FR | 2 543 054 | 9/1984 |
| FR | 2 565 262 | 12/1985 |
| JP | 58-156714 | 9/1983 |

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

The invention provides a mechanical part for hinging to other mechanical parts at its ends, the mechanical part being made at least in part out of composite material from a central fiber preform and a peripheral fiber preform both of three-dimensional woven fabric, which preforms are assembled together while dry and then impregnated with resin, the peripheral preform surrounding the central preform in such a manner as to leave two empty spaces at the ends of the part and between the two preforms, which spaces are dedicated to hinging to said other parts. Metal inserts can be received in said spaces. The mechanical part can be used as a lever for a landing gear brace.

13 Claims, 6 Drawing Sheets

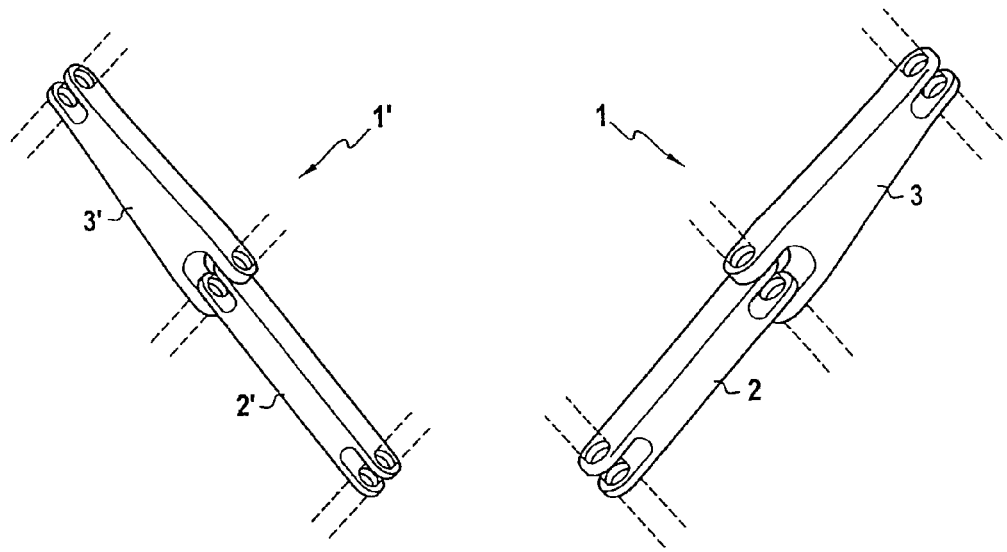
FIG.1A
BACKGROUND ART
FIG.1B
BACKGROUND ART
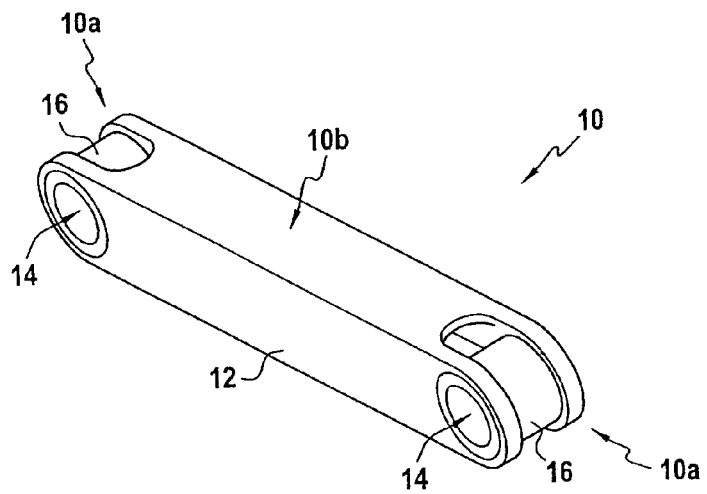
FIG.2

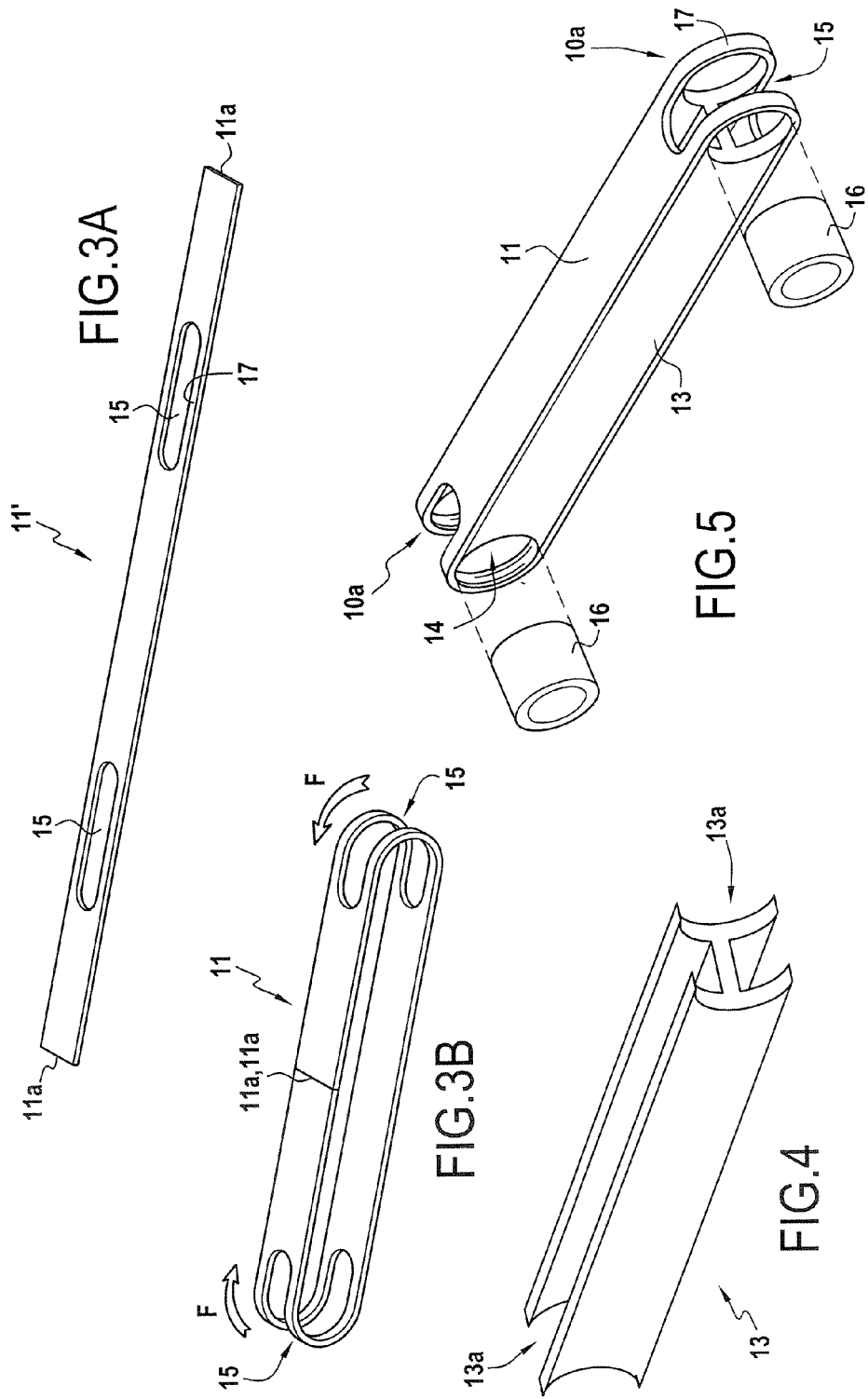

MECHANICAL PART AND METHOD OF MANUFACTURING SUCH A PART

The invention relates to a mechanical part for hinging to other parts at its ends, and to a method of manufacturing such a part.

More particularly, the invention can apply to a brace lever for landing gear.

BACKGROUND OF THE INVENTION

FIG. 1 shows an undercarriage having two braces 1 and 1' referred to respectively as a brace strut and as a side brace, and shown in detail in FIGS. 1A and 1B. These braces are hinged to the leg 4 of the undercarriage and to the undercarriage frame 5. Each brace 1, 1' comprises two levers: a top lever 3, 3' and a bottom lever 2, 2'. The levers of a brace are hinged to each other and to the other parts of the undercarriage at their ends, via hinge pins represented by dashed lines in FIGS. 1A and 1B.

Such levers are known and are subjected in operation to large mechanical forces, mainly in compression and in traction, extending along the longitudinal axis of the part (the axis passing through both ends of the part). These levers are made of steel, aluminum, or titanium alloy.

It is known to be advantageous to make such levers lighter in weight in order to facilitate the operation of the landing gear. In addition, and in general, reducing the weight of each component of an aircraft is a perpetual preoccupation.

Documents FR 2 543 054 and EP 0 678 681A1 disclose mechanical parts, in particular connecting rods, that are light in weight since they are made of composite material. Document EP 0 678 681A1 describes a one-piece connecting rod obtained from superposed and assembled-together layers of resin-preimpregnated yarn. Document FR 2 543 054 describes a connecting rod made from a central portion obtained from superposed and assembled-together layers of resin-preimpregnated yarn, and peripheral portion made by winding a resin-preimpregnated filament or tape.

Such composite materials are nevertheless liable to delamination: in use the layers of fibers, filaments, or tapes separate from one another, mainly because of the repeated mechanical forces to which the part is subjected.

OBJECTS AND SUMMARY OF THE INVENTION

An object of the invention is to propose a mechanical part of light weight that withstands forces well.

To achieve this object, the invention provides a mechanical part comprising at least two ends and designed to be hinged to other parts at its ends, wherein at least a portion of it is made of composite material from a central fiber preform of three-dimensional woven fabric, suitable more particularly from withstanding the compression forces to which the part is subjected in operation, and at least one peripheral fiber preform of three-dimensional woven fabric suitable, more particularly, for withstanding the traction forces to which the part is subjected in operation, said peripheral preform surrounding said central preform in such a manner as to leave two empty spaces at the ends of the part and between the two preforms, which empty spaces are dedicated to hinging to said other parts.

The mechanical part of the invention can find an application in numerous fields other than aviation. For example, it can be used as a connecting rod. In addition, the number of ends of the part, and thus the number of potential hinge points, is not limited to two, thereby further enlarging its field of application.

The composite material part of the invention is of weight that is limited compared with parts made entirely out of metal. Advantageously, said part is made of a composite material having a matrix that is organic (and not metallic), and the fiber preforms are made of carbon fibers, thus providing a good compromise between mechanical strength and light weight.

Furthermore, the problems of delamination encountered in compose material parts of the prior art are avoided since said central preform, like said peripheral preforms, are not of a laminated structure but of a three-dimensional woven fabric structure and the woven fibers are particularly well secured to one another.

Furthermore, unlike other technologies that are more limited in terms of thickness and shape, three-dimensional weaving provides greater freedom in designing the parts.

In addition, the woven central and peripheral fiber preforms may differ in terms of the general orientation of the fibers, of fiber content (fiber density per unit volume), of the distribution between warp and weft fibers (or yarns), and/or of the way in which the fibers making them up cross one another (or shrinkage). By acting on these differences, it can be ensured that the central portion of the part presents mechanical properties that are different from those of the peripheral portion. Thus, the strength of each of these portions of the mechanical part can be adapted to the main types of mechanical force (compression, traction, drifting, buckling, . . . ) to which they are subjected in operation, thereby improving the overall strength of the part.

Another advantage of the part of the invention lies in the simplicity with which it can be manufactured: by using two preforms, it is possible to select shapes for them that are simple and easy to make by three-dimensional weaving.

Thus, advantageously, the peripheral preform is a thick strip that can be manufactured flat and whose ends are subsequently united so as to form a ring. The central preform has a specific section, advantageously, an H or an I or an X section. These section shapes can be obtained easily by using known three-dimensional weaving techniques. The section of the central preform is selected so as to obtain, for limited volume of material (fibers and resin), good mechanical strength in compression between the two ends of the part, and also good strength in twisting and/or buckling.

In a particular embodiment of the part, it includes inserts forming bearings that are received in the empty spaces for hinging to other parts.

These inserts serve to protect the walls of said empty spaces against wear. When the part of the invention is hinged to other parts via hinge pins, these pins are generally made of metal. It is thus possible to select inserts that are made of metal in order to provide metal-on-metal contact between the insert and the pin.

An alternative to inserts consists in lining the walls of said empty spaces with an antiwear lining.

The invention also provides a method of manufacturing a mechanical part comprising at least two ends and designed to be hinged to other parts at its ends, the method comprising the steps of three-dimensionally weaving a central fiber preform and at least one peripheral fiber preform, placing said peripheral preform around said central preform in such a manner as to leave two empty spaces at the ends of the part and between said preforms, said spaces being dedicated to hinging to said other parts, and impregnating said dry fiber preforms with a matrix-forming resin.

Advantageously, two fiber preforms are assembled together while they are dry, thus making it possible firstly to handle a single assembly for impregnating with resin, and secondly to reinforce the bonding between said preforms (which bonding is also provided with the help of the resin). For example, it is possible to assemble together two dry fiber preforms by implanting bonding yarns, each bonding yarn being implanted so as to pass through both preforms, at least in part.

In a particular implementation, inserts are placed in said empty spaces before impregnating the assembly with resin, thereby enabling the resin, as it sets, to adhere to the inserts, thereby securing them.

In another implementation, the inserts can be secured to an already-made portion of the body, e.g. by riveting, by adhesive, or by any other appropriate fastener means.

BRIEF DESCRIPTION OF THE DRAWINGS

The invention and its advantages can be better understood on reading the following detailed description of an embodiment of a mechanical part of the invention. The description is given with reference to the accompanying figures in which:

FIG. 1A shows a detail of the side brace of the FIG. 1 undercarriage;

FIG. 1B shows a detail of the brace strut of the FIG. 1 undercarriage;

FIG. 2 shows an example of a mechanical part of the invention;

FIG. 3A shows a strip of woven fibers;

FIG. 3B shows the peripheral fiber preform obtained from the fiber strip of FIG. 3A, and used for making the part of FIG. 2;

FIG. 4 shows the central fiber preform used for making the part of FIG. 2;

FIG. 5 shows the central and peripheral preforms of FIGS. 3B and 4 assembled together, and also shows two inserts ready for being inserted in said assembly;

MORE DETAILED DESCRIPTION

Figure 1:
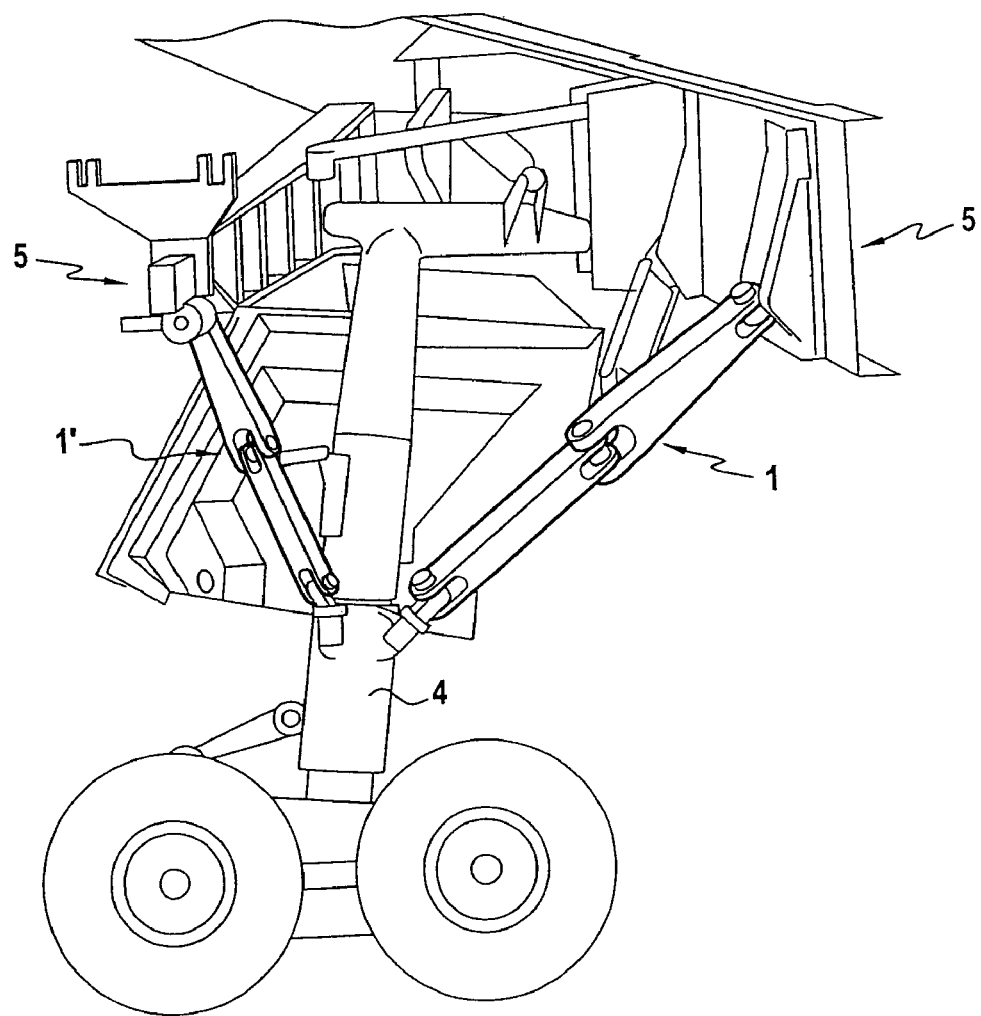
FIG. 1 shows an example of an undercarriage.

An example of a mechanical part 10 of the invention is shown in FIG. 2. This part 10 can be used as the bottom or top lever of a landing gear brace.

The part 10 comprises a body 12 of composite material, as shown in FIG. 5, and as made up from fiber preforms 11 and 13 as shown in FIGS. 3B and 4.

The part 10 is a long and rectilinear part having two ends 10a at which there are formed two cylindrical empty spaces 14. The ends 10a are semicylindrical in shape, while the middle portion 10b of the part 10 is generally in the form of a rectangular parallelepiped.

Hollow cylindrical inserts 16 of diameter corresponding to the diameter of the empty spaces 14 are received in said spaces. Each of these inserts 16 may present a flange (not shown) on at least one end. The inserts 16 are designed to carry a pin enabling the part 10 to be hinged to other parts. The pin and the inserts are made of titanium alloy, for example, since this type of alloy presents a good compromise between strength, ability to withstand high temperatures, and light weight. Furthermore, friction between titanium alloys (and more generally friction between metals or alloys) has been studied in depth and is nowadays well controlled.

FIGS. 3B and 4 show the fiber preforms 11 and 13 used for making the body 12 of the part 10. These preforms are made by three-dimensionally weaving carbon fiber strands. For weaving purposes, carbon fiber strands are used both as warp yarns and as weft yarns.

FIGS. 8A to 8H show successive planes of an example of the way the warp yarns 19 and the weft yarns 18 form a three-dimensional wave. For a limited number of weft yarns 18 there are shown the paths taken by the warp yarns 19 between the weft yarns 18. In each plane, these paths may be substantially sinusoidal, or as shown they may be more complex. Furthermore, the paths generally differ from one section plane to another. The type of three-dimensional weaving used can have an influence on the final mechanical properties of the part. Thus, advantageously, the weaving used for the central part differs from that used for the peripheral part, since these parts have different mechanical functions.

The peripheral preform 11 shown in FIG. 3B is made from a sufficiently-thick strip of fibers 11' having two openings 15 formed therein, as shown in FIG. 3A. These openings 15 are optional: their presence depends on the way in which the part 10 is hinged to other parts and it is possible to provide only one opening 15 or no opening in the strip 11'.

Each opening 15 passing through the thickness is oblong in shape in the example shown, extending longitudinally with rounded ends. Portions of the strip 11' extend on either side of the openings 15. Advantageously, steps are taken to avoid forming sharp edges on the outlines of the openings 15, since such edges could weaken the part 10.

The strip is subsequently looped as shown by arrows F so as to unite its ends 11a. In order to unite the ends 11a, it is possible to use stitching or adhesive techniques or indeed any other suitable technique. Advantageously, a technique is used whereby linking yarns are implanted between the ends of the strip. This technique is described in greater detail below.

Once the strip has been curved to form a loop, and its ends 11a have been united, the openings 15 situated at the opposite ends of the loop face each other.

Each opening 15 forms a window giving access to one of the empty spaces 14 at the ends, such that a part hinged to the part of the invention can be mounted inside the window between the strip portions 17. The bottom lever 2 shown in FIG. 1B is mounted in this way relative to the top lever 3. Under such circumstances, and contrary to that which is shown in FIG. 5, the insert 16 does not extend across the entire width of the preform 11, but can be replaced by two inserts of narrower width mounted on the respective inside faces of the strip portions 17.

During tests performed on brace levers, it has been found that the central and peripheral portions of the levers are both subjected mainly to longitudinal forces in traction and compression (i.e. forces acting mainly along the axis passing through the two ends of the part). It has also been observed that the greatest traction forces are exerted on the peripheral portions of the levers while the greatest compression forces are exerted on the central portions of the levers.

Since the traction forces acting on the peripheral preform 11 are radial (relative to the axes of the empty spaces), the fibers of the preform are advantageously mostly oriented in the long direction of the strip 11', so as to enhance the longitudinal mechanical strength thereof (during weaving it is the warp yarns that extend in the long direction of the strip).

The central fiber preform 13 is a beam having a specific H-section and the strip 11 rests on the top and bottom ends of the two parallel flanges 9 of the H-section. The ends 13*a* of the preform 13 are inscribed within the surfaces of circular half-cylinders, thus making it possible to define two empty spaces between said ends 13*a* and the strip 11, which empty spaces are substantially cylindrical. Advantageously, the axes of revolution of said empty spaces lie in the plane containing the web 8 of the central preform 13 (the web 8 forming the cross-bar of the H-shape).

The greatest forces to which the central preform 13 is subjected are longitudinal compression forces acting between the two ends 13*a*. The specific H-section and the three-dimensional weaving parameters (fiber orientation and crossings, distribution of warp and weft yarns, fiber content, . . . ) take this force distribution into account.

Once the preforms 11 and 13 have been made, they are engaged one in another by placing the preform 13 inside the preform 11, and advantageously they are assembled together by stitching, adhesive, or any other suitable means. Preferably, a yarn-implanting technique is used that consists in implanting link yarns through the preforms 11 and 13, each link yarn being implanted so as to pass through each of the preforms, at least in part.

In practice, each link yarn is put into place by being driven by a fluid under pressure inside a tubular needle that is itself driven with reciprocating movements, during each of which it penetrates into the superposed preform portions 11 and 13, and is then withdrawn, leaving a link yarn in place, and with another link yarn being put into place after the needle has been moved. The peripheral preform 11 can thus be bonded to the central preform 13 by making a plurality of perforations in which the link fibers are deposited. The depth of the perforations (i.e. the penetration depth of the needle) is selected so that each link yarn passes right through the peripheral preform 11 and through at least a fraction of the central preform 13. This method is described in detail in document FR 2 565 262.

Thereafter, the inserts are placed inside the empty spaces 14 at the ends. The walls of these spaces are formed firstly by the ends 13*a* of semicylindrical outline of the central preform 13, and secondly by the strip portions 17 on either side of the openings 15 in the peripheral preform 11.

Thereafter, the fiber preforms 11 and 13 are impregnated with resin so that the resin penetrates between the fibers so that the fibers are embedded in the resin. The preforms must therefore be permeable to the resin. The fiber preforms then form the fiber reinforcement of the composite material and the resin forms the matrix of said material.

Several known methods for impregnating fibers with resin can be used, including: resin transfer molding (RTM), vacuum-assisted resin transfer molding (VARTM), or indeed vacuum-assisted resin infusion (VARI).

With the RTM method, the assembly comprising the fiber preforms 11 and 13 and the inserts 16 is placed inside a closed mold of general shape corresponding to that of the mechanical part that is to be made, and resin is injected into the mold. The resin then penetrates into the assembly formed by the fiber preforms. Naturally, precautions are taken to ensure that the resin does not fill the empty spaces 14.

Advantageously, epoxy resin is used because of its compatibility with carbon fibers and because of its good mechanical properties. On setting, the resin serves to secure the inserts 16 to the body 12 of the part 10. Once the resin has set and after unmolding, the part 10 as shown in FIG. 2 is obtained. It is possible to envisage a finishing machining step, should that be necessary.

Figure 6:
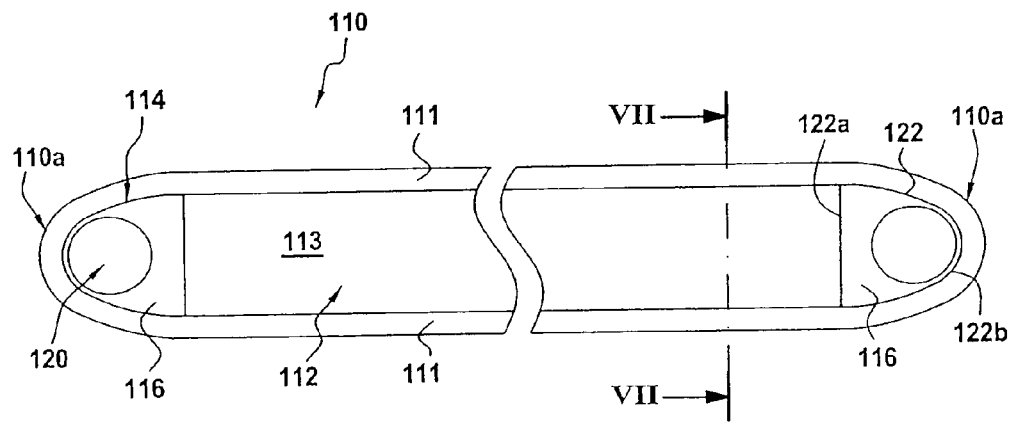
FIG. 6 shows a second example of a mechanical part of the invention.
Figure 7:
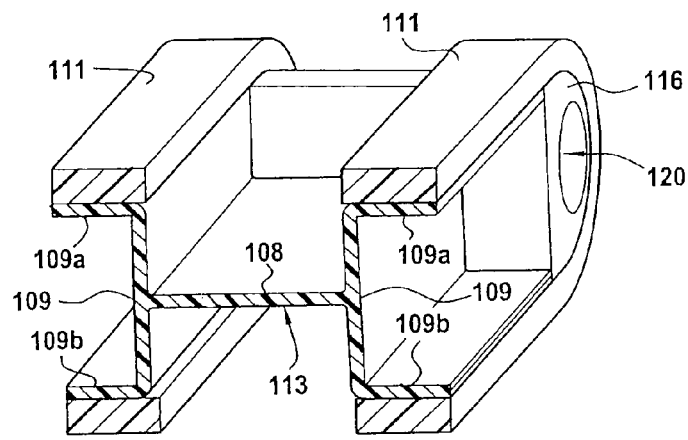
FIG. 7 is a perspective view in cross-section on plane VII-VII of FIG. 6.
Figure 8A:
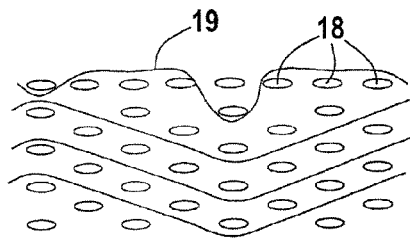
FIGS. 8A to 8H show the sequencing (on eight successive planes) of one example of a weave obtained by three-dimensional weaving.
Figure 8E:
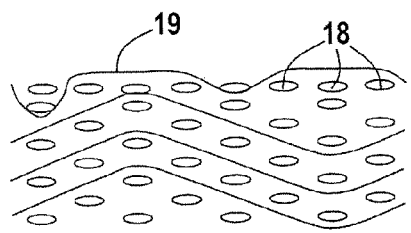
Figure 8B:
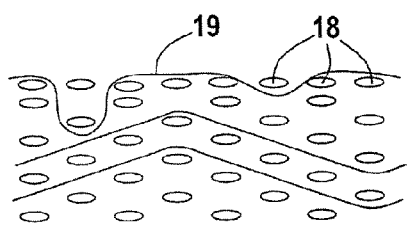
Figure 8F:
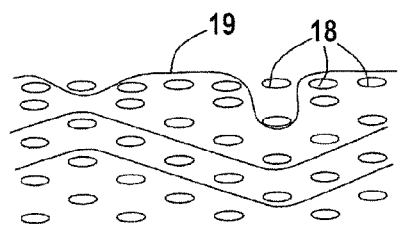
Figure 8C:
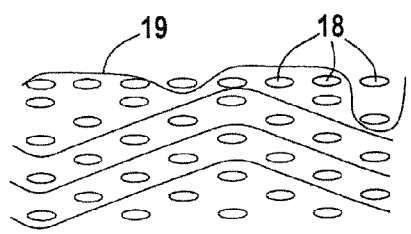
Figure 8G:
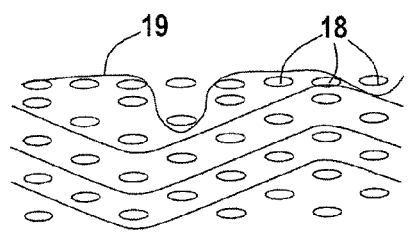
Figure 8D:
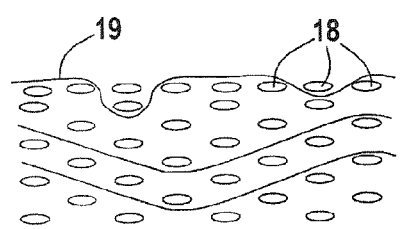
Figure 8H:
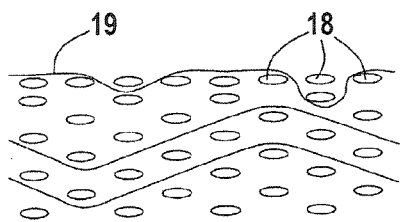

FIGS. 6 and 7 show a second example of a mechanical part 110 of the invention suitable for use as a lever in a landing gear brace. The elements of the part 110 that have functions analogous to those of the elements shown in FIGS. 2 to 5 are given the same numerical references plus 100.

The part 110 is made from an elongate body 112 of composite material presenting two empty spaces 114 at its ends 110*a* for the purpose of hinging the part 110 to other parts (not shown). Inserts 116 are received in said empty spaces 114 and define cylindrical empty spaces 120 suitable for receiving hinge pins, such that the inserts 116 form bearings for the pins.

The body 112 comprises a central fiber preform 113 and two peripheral fiber preforms 111 of three-dimensional woven fabric, the peripheral preforms surrounding the central preform 113 so as to leave the two empty spaces 114 at the ends 110*a* of the part between the preforms 111 and 113.

The peripheral fiber preforms 111 are equal-length strips of fabric whose two ends are united. Compared with the preform 11 described above, the preforms 111 do not have any openings and they are narrower.

The central fiber preform 113 is a beam having a specific H-section, and each strip 111 rests on the top and bottom ends 109*a* and 109*b* of a corresponding flange 109 of the H-shape. These top and bottom ends 109*a* and 109*b* are not in line with the flanges 109, but are folded outwards. The ends 109*a* and 109*b* are substantially perpendicular to the flanges 109 so that they are substantially parallel to the web (or spacer) 108 of the preform 113. The ends 109*a* and 109*b* are on one side of the plane defined by the corresponding flange 109, while the web 108 is situated on the opposite side thereof.

Advantageously, the strips 111 are of the same width as the ends 109*a* and 109*b*, and the strips 111 are secured to said ends by any appropriate fastener means, and preferably with the help of implanted link yarns, as described above.

The ends of the central fiber preform 113 are plane so that the empty spaces 114 defined together with the strips 111 present respective outlines 122 as shown in FIG. 6. Such an outline 122 has a rectilinear portion 122*a* matching the preform 113 and a curvilinear portion 122*b* matching the curved portions of the strips 111.

The inserts 116 are of a shape that is complementary to the shape of the empty spaces 114, and they thus present plane surfaces where they come into contact with the ends of the central preform 113 and curved surfaces where they are partially covered by the strips 111.

This embodiment serves to simplify the shape and thus the manufacture (the weaving) of the ends of the central preform 113. The inserts 116 which are general made of metal alloy are easily made to have this shape, e.g. by casting. In addition, the quantity of fibers and resin needed for making the part 110 is improved.

Figure 9:
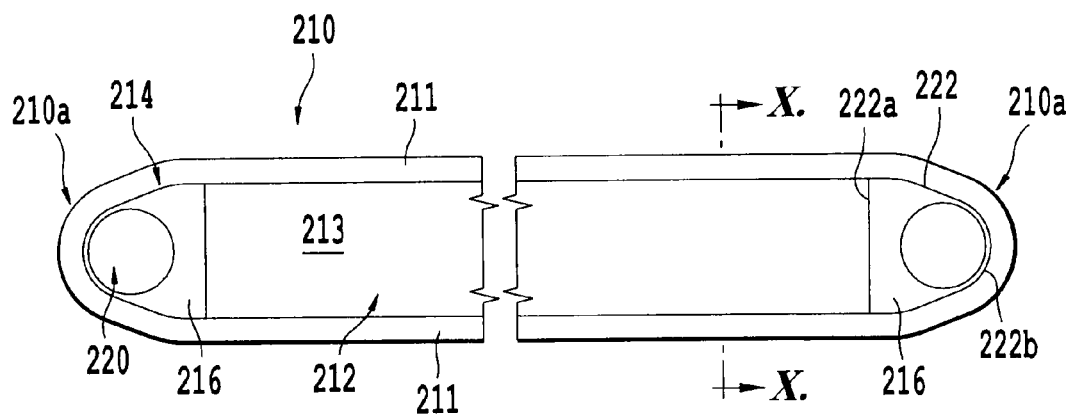
FIG. 9 shows a third example of a mechanical part of the invention.
Figure 10:
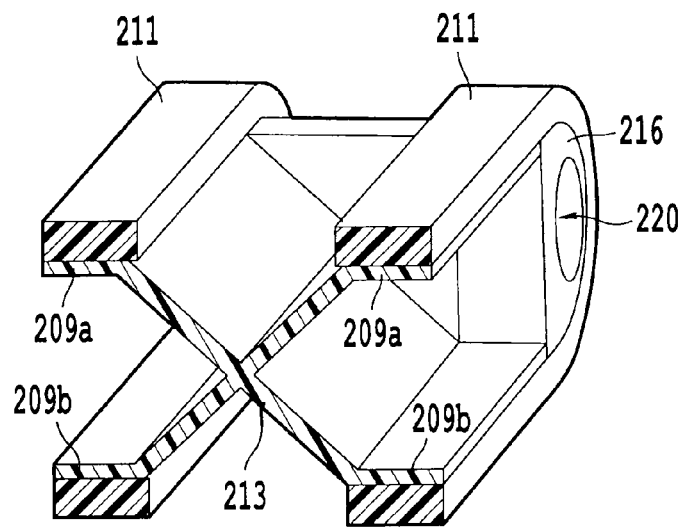
FIG. 10 is a perspective view in cross-section on plane X-X of FIG. 9.

FIGS. 9 and 10 show a third example of a mechanical part 210 of the invention suitable for use as a lever in a landing gear brace. The elements of the part 210 that have functions analogous to those of the elements shown in FIGS. 2 to 5 are given the same numerical references plus 200.

The part 210 is made from an elongate body 212 of composite material presenting two empty spaces 214 at its ends 210*a* for the purpose of hinging the part 210 to other parts (not shown). Inserts 216 are received in said empty spaces 214 and define cylindrical empty spaces 220 suitable for receiving hinge pins, such that the inserts 216 form bearings for the pins.

The body 212 comprises a central fiber preform 213 and two peripheral fiber preforms 211 of three-dimensional woven fabric, the peripheral preforms surrounding the central preform 213 so as to leave the two empty spaces 214 at the ends 210a of the part between the preforms 211 and 213.

The peripheral fiber preforms 211 are equal-length strips of fabric whose two ends are united. Compared with the preform 11 described above, the preforms 211 do not have any openings and they are narrower.

The central fiber preform 213 is a beam having a specific X-section, and each strip 211 rests on the top and bottom ends 209a and 209b of the X-shape.

Advantageously, the strips 211 are of the same width as the ends 209a and 209b, and the strips 211 are secured to said ends by any appropriate fastener means, and preferably with the help of implanted link yarns, as described above.

The ends of the central fiber preform 213 are plane so that the empty spaces 214 defined together with the strips 211 present respective outlines 222 as shown in FIG. 9. Such an outline 222 has a rectilinear portion 222a matching the preform 213 and a curvilinear portion 222b matching the curved portions of the strips 211.

The inserts 216 are of a shape that is complementary to the shape of the empty spaces 214, and they thus present plane surfaces where they come into contact with the ends of the central preform 213 and curved surfaces where they are partially covered by the strips 211.

What is claimed is:

1. A mechanical part, comprising:
    at least two ends configured to hinge the part to other parts at each of the at least two ends;
    a central fiber preform of three-dimensional woven fabric configured to withstand compression forces to which the part is subjected in operation, said central fiber preform including an upper flange and a lower flange; and
    at least one peripheral fiber preform of three-dimensional woven fabric configured to withstand traction forces to which the part is subjected in operation,
    wherein said part is a lever of a landing gear brace,
    wherein at least a portion of the part includes composite material,
    wherein said at least one peripheral fiber preform surrounds said central preform so as to form two empty spaces at the respective ends of the part and between the central and peripheral preforms, said empty spaces configured to hinge to said other parts,
    wherein said at least one peripheral fiber preform abuts said upper flange and said lower flange of said central fiber perform, and
    wherein said at least one peripheral fiber preform includes at least one opening at one of the ends of the part, said at least one opening being contained within a lateral width thereof and forming a window to access a respective one of the empty spaces at the one of the ends of the part.

2. A mechanical part according to claim 1, wherein said at least one peripheral fiber preform is a strip whose two ends are united.

3. A mechanical part according to claim 1, wherein said central fiber preform presents a specific H-, or I-, or X-shaped section.

4. A mechanical part according to claim 1, further comprising inserts which form bearings that are received in said empty spaces.

5. A mechanical part according to claim 1, wherein said central and peripheral preforms are bonded together by implanted link yarns, each link yarn passing through each of the preforms, at least in part.

6. A mechanical part according to claim 1, wherein said central and peripheral preforms are embedded in an organic matrix.

7. A mechanical part according to claim 6, wherein said central and peripheral preforms are embedded in an organic matrix of epoxy resin.

8. An undercarriage including a brace comprising a plurality of levers, wherein at least one of said levers is a mechanical part according to claim 1.

9. A mechanical part according to claim 1, wherein ends of said central preform include surfaces of circular half-cylinders.

10. A mechanical part according to claim 1, wherein a width of said at least one peripheral fiber preform is substantially the same as a width of said central fiber preform.

11. A mechanical part according to claim 1, wherein a width of said at least one peripheral fiber preform is substantially the same as a width of said upper flange and said lower flange of said central fiber preform.

12. A mechanical part according to claim 1, wherein a weaving path of the central preform differs from a weaving path of the at least one peripheral preform.

13. A mechanical part according to claim 1, wherein said at least one peripheral fiber preform includes two openings situated at opposite ends of the part, said two openings facing each other.

* * * * *